Sept. 11, 1962 M. J. D. NURSE 3,053,933

TELEVISION CIRCUITS

Filed Sept. 4, 1959 2 Sheets-Sheet 1

Inventor
M.J.D. Nurse
By Holcombe, Wetherill & Brisebois
Attorneys

Inventor
M. J. D. Nurse
By Holcombe, Wetherill & Brisebois
Attorneys

United States Patent Office 3,053,933
Patented Sept. 11, 1962

3,053,933
TELEVISION CIRCUITS

Michael J. D. Nurse, Cambridge, England, assignor to Pye Limited, Cambridge, England, a company of Great Britain Filed Sept. 4, 1959, Ser. No. 838,139
Claims priority, application Great Britain Sept. 9, 1958
10 Claims. (Cl. 178—7.3)

Figure 1:
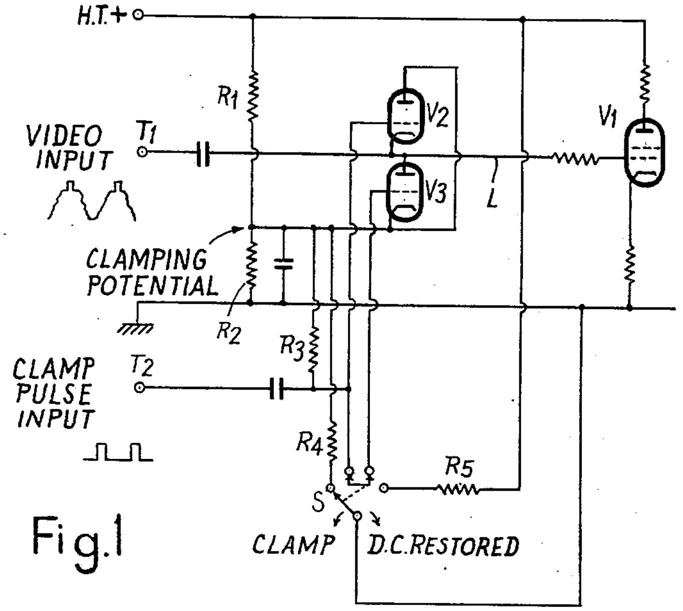

The present invention relates to electronic circuits particularly for television signals.

It is sometimes desirable, for example in television monitors, to provide means whereby the video signal applied to a video amplifier circuit may be clamped to a reference potential to remove any hum or spurious interference content from the incoming signals in order to provide a picture of high quality and alternatively a condition in which the video signal is not clamped but is merely D.C. restored. In this way it is possible to check the actual quality of the video signal for hum and interference when the D.C. restoration is operative, as well as to have a signal of optimum quality when the clamp circuit is in operation.

It is an object of the present invention to provide circuit arrangements having the above facilities.

According to the present invention there is provided a pulse-operated clamp circuit to enable a video signal to be clamped to a desired potential by means of clamping pulses and including switch means which can be operated to render a part of the clamp circuit inoperative and to cause another part of the clamp circuit to operate as a D.C. restorer to restore the video signal to a predetermined D.C. level.

In one form of the invention the clamp circuit comprises two triode valves respectively connected with opposite polarity in parallel between the video input and a point of clamping potential and having clamp pulses applied to both grids simultaneously. When it is desired that the circuit should operate as a D.C. restorer, the switch means render the clamp pulses ineffective on the triodes and also cut off one triode and apply a potential to the grid of the other triode to cause it to operate as a D.C. restorer. The potential may be derived from the high tension supply through a series resistance. Means are preferably provided to maintain the D.C. restoration potential at the same value as the clamping potential.

According to another form of the invention, the clamp circuit comprises two diode valves respectively connected with opposite polarity between the video input and the two outputs of a phase splitting device to which the clamping pulses are applied. When it is desired that the circuit should operate as a D.C. restorer one of the diodes is made inoperative. The clamp pulses may also be removed from the other diode in which case it restores the synchronizing pulse tips of the video signal or alternatively the clamp pulses may still be applied to the other diode so that it can restore the black level of the video signal.

The phase splitting device preferably includes a D.C. restorer in its input for restoring the applied clamping pulses to a reference potential which also constitutes the clamping potential.

According to a feature of the invention, the switch means is arranged so that none of the switching occurs directly in or on the video signal path to the input of the video amplifier, and the capacitance of the switch means and associated wiring is thereby prevented from affecting the amplifier response.

Figure 2:
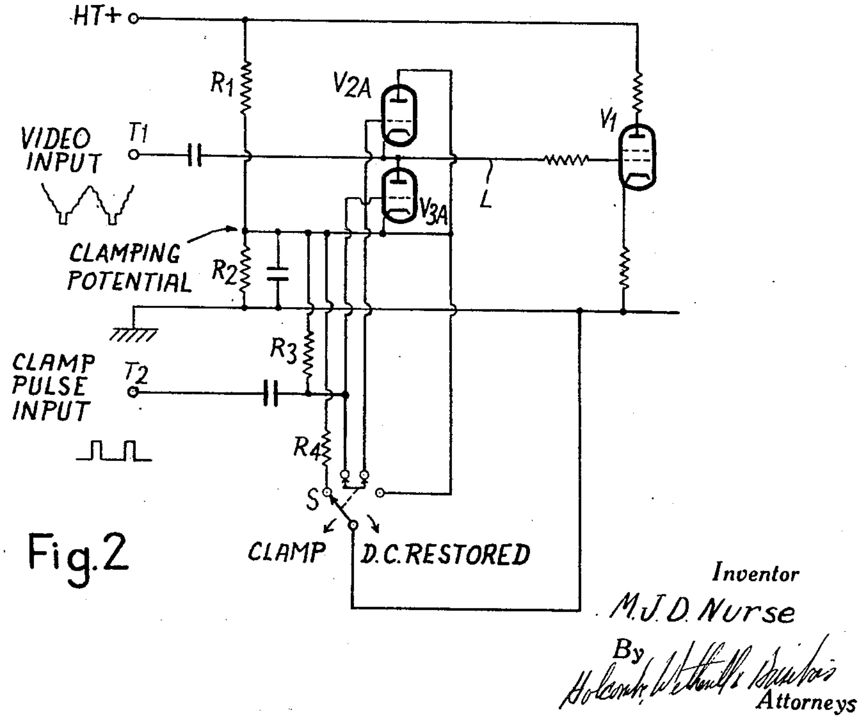
Figure 3:
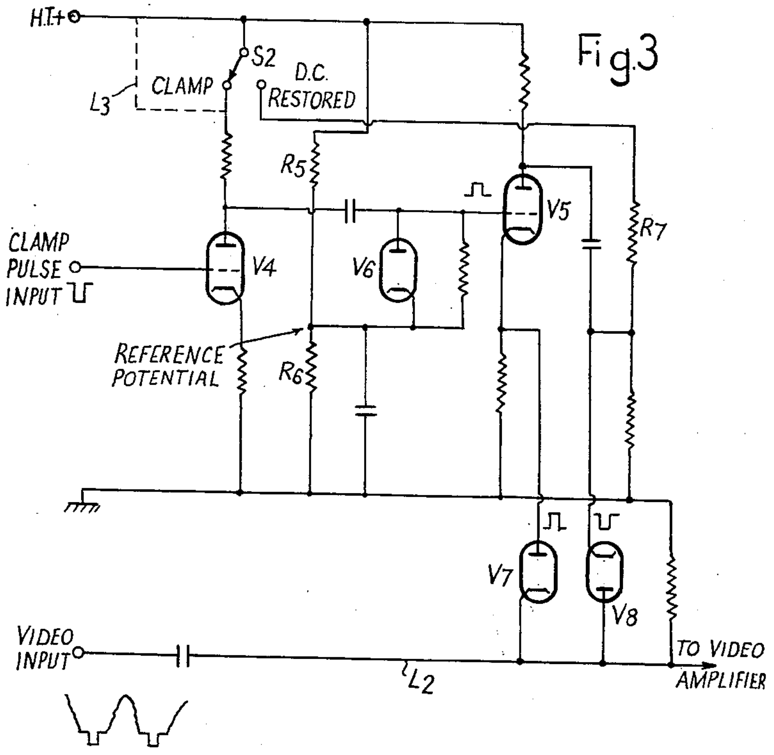
Figure 4:
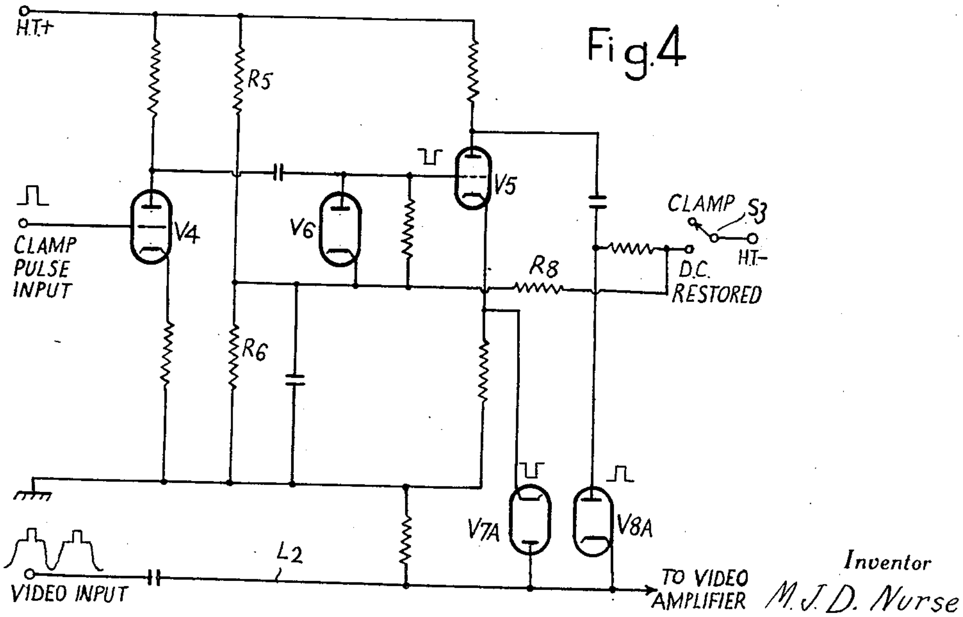

In order that the invention may be more fully understood reference will now be made to the accompanying drawing in which:

FIGURE 1 is a circuit diagram of one embodiment of circuit arrangement according to the invention intended for use with negative-going video signals, FIGURE 2 shows a modified circuit arrangement for use for positive-going video signals, FIGURE 3 shows a further circuit arrangement for positive-going video signals, and FIGURE 4 shows another circuit arrangement for negative-going video signals.

Referring to FIGURE 1, the circuit consists of a video amplifier valve V1 to the control grid of which is applied a negative-going video signal from the terminal T1 via the lead L. A pulse-operated clamp circuit is provided consisting of two triodes V2 and V3 respectively having their cathode and anode connected to this lead. The anode of V2 and the cathode of V3 are taken to the junction of resistors R1 and R2 connected across the high tension supply, this point determining the clamping potential. Clamp pulses may be applied to terminal T2 for feeding to the grids of the triodes V2 and V3 via two contacts of two-position switch S which selects whether the input video signals are clamped or D.C. restored. The resistor R3 is connected between the point of clamping potential and the clamp pulse input lead and the resistor R4 is connected between the point of clamping potential and one of the switch contacts for the purpose which will be described later. A potential derived from the positive high tension supply line through resistor R5 is fed to another switch contact and the common pole of the switch is connected to chassis potential.

The operation of the circuit is as follows:

In the "Clamp" position of the switch S (the position shown in FIGURE 1), the two triodes V2 and V3 operate as a conventional double-triode clamp circuit with the clamp pulse applied to both grids simultaneously and a video signal fed via terminal T1 is clamped to the desired clamping potential which is provided by the resistor network R1, R2, R4.

In the "D.C. Restored" position of switch S, the triode V2 has its grid taken to chassis potential and hence well negative to the clamping potential, thus cutting this triode off. The grid of V2 may alternatively be connected to any other potential sufficiently negative to render the valve inoperative during any possible signal excursion. The triode V3 has the clamp pulses removed from its grid which is then connected to a positive potential via resistor R5 which serves to limit the grid current. The triode V3 now acts as a conventional D.C. restorer, restoring the video signal level to the cathode potential whenever the anode goes positive to its cathode. The cathode potential is now derived from the resistive network R1, R2, R3: R3 being in parallel with R2. R4 is provided and has an identical value with R3 so that in the two states the clamping potential and restoration potential remain constant.

The above circuit operates on a negative-going video signal whilst the circuit shown in FIGURE 2 is designed to operate on a positive-going video signal. The clamp circuit condition is identical with that in FIGURE 1, whilst in the D.C. restored condition, the upper triode V2A acts as the D.C. restorer and has its grid connected to its anode to act as a diode and the lower triode V3A is cut off since its grid is connected to chassis potential. The grid return of V3A need not be to chassis potential but can be to any potential sufficiently negative to render the valve non-conducting during any possible signal excursion.

In the embodiment of FIGURE 3, a positive-going video signal to be applied to a video amplifier is fed along line L2 to which is connected the cathode of the diode V7 and the anode of the diode V8. The anode of diode V7 and the cathode of diode V8 are respectively connected to the cathode and anode of a phase splitting valve, consisting of a triode V5 fed with clamping pulses from triode V4. It should be noted that diode V7 is D.C. connected to the cathode of V5. The triode V4 may itself constitute a clamp pulse generator or may merely consist of a pulse amplifier or clipping stage. The clamp pulses are applied to the grid of the phase splitter V5 and restored at its grid by the diode V6 to the reference potential existing at the junction of resistors R5 and R6 connected across the high tension supply. This reference potential is positive to earth so that valve V5 is conducting and its cathode also assumes this same reference potential which is, in effect, the clamping potential. With switch S2 in the "clamp" position, as shown, the clamp pulses are therefore fed through the phase splitter V5 to the diodes V7 and V8 to clamp the video signal to the reference potential. When switch S2 is moved to the "D.C. restored" position, the potential is removed from the anode of valve V4 and hence no clamp pulses are fed through this valve. At the same time a positive potential is applied through resistors R7 to the cathode of diode V8 which is therefore cut-off and rendered non-operative. The remaining diode V7 now acts as a simple D.C. restoring diode restoring the tips of the synchronising pulses of the video signal to the reference potential which is fed through valve V5 now acting as a D.C. cathode follower.

The circuit of FIGURE 3 can be modified so that in the D.C. restoring condition it is the black level of the video signal which is D.C. restored instead of the tips of the synchronising pulses. For such an arrangement the anode of the valve V4 is not connected to switch S2 but remains connected to the high tension positive supply at all times, as shown by the dotted line connection L3, and the switch S2 only controls the application of a positive voltage to the cathode of diode V8 through resistor R7. With such an arrangement the clamp pulses are still fed through V4 and V5 to the diode V7 for D.C. restoring the black level of the video signal. This arrangement possesses the advantage that the black level of the video signal will not alter when changing from the clamped condition to the D.C. restored condition.

FIGURE 4 shows a circuit arrangement generally similar to FIGURE 3 but which is intended to be used with a negative-going video signal. In the clamp condition the operation of the circuit is identical to that for FIGURE 3 except that the polarity of the clamp pulses fed to the phase splitter have been reversed, as has also the polarity of the clamping diodes V7A, V8A. In order to obtain D.C. restoration with this circuit, the switch S3 is closed to apply the H.T. negative potential to the anode of diode V8A to render it inoperative and the same negative bias is applied through resistor R8 to cut-off phase splitter V5 and render the clamp pulses inoperative. V7A will now operate to D.C. restore the tips of the synchronising pulses of the video signal. This circuit can also be arranged to D.C. restore the black level of the video signal by omitting the connection through R8 to the grid of the phase splitter V5, in which case the negative potential is only applied to the anode of diode V8A and the phase splitter is still operative to pass clamp pulses to the diode V7A.

It will be seen that the circuit arrangements according to the present invention enables the video signal selectively to be clamped or D.C. restored without any switching directly in or on the video input connection to the video amplifier and so maintains the capacitive loading on lead L at a low value. Remote switching can thus be achieved without adversely affecting the video response. The circuit is also economic in components and the control switch can be placed in a readily accessible position without requiring any extension or re-routing of the video signal leads.

It will be understood that various modifications may be made without departing from the scope of this invention. For example, in FIGURES 1 and 2 V2 and V3 may constitute multigrid valves instead of triodes. Moreover the clamping reference potential may be produced by other means than from an intermediate point on a resistor chain across the high tension supply.

In addition, in the arrangement of FIGURES 3 and 4 it is possible, by the use of increased switching to arrange for one circuit to operate either for clamping the television signal or for D.C. restoring the tips of the synchronizing pulses of the television signal or yet again for D.C. restoring the black level of the television signal.

I claim:

1. A circuit arrangement for alternatively clamping or D.C. restoring a video signal, comprising a pulse-operated clamp circuit having plural electronic devices, means for applying clamping pulses to the electronic devices of said clamp circuit, means for applying the video signal to the electronic devices of said clamp circuit to enable the video signal to be clamped to a predetermined potential during the period of said clamping pulses and mechanical switch means connected to said clamp circuit and operable for rendering at least one of the electronic devices of the clamp circuit inoperative and for causing another of the electronic devices of the clamp circuit to operate as a D.C. restorer to restore the video signal to a predetermined D.C. level.

2. A circuit arrangement for alternatively clamping or D.C. restoring a video signal, comprising a pulse-operated clamp circuit having plural electronic devices, means for applying clamping pulses to the electronic devices of said clamp circuit, means for applying the video signal to the electronic devices of said clamp circuit to enable the video signal to be clamped to a predetermined potential during the period of said clamping pulses and mechanical switch means connected to said clamp circuit but isolated from the video signal path and operable for rendering at least one of the electronic devices of the clamp circuit inoperative and for causing another of the electronic devices of the clamp circuit to operate as a D.C restorer to restore the video signal to a predetermined D.C. level.

3. A circuit arrangement for alternatively clamping or D.C. restoring a video signal, comprising a conductor carrying the video signal, a clamp circuit consisting of two valves each having an anode, a cathode, and at least one grid electrode, means connecting the anode of one valve to the cathode of the other valve and to the conductor carrying the video signal, means connecting the cathode of the one valve to the anode of the other valve and to a point of clamping potential, a source of clamping pulses, means for applying said clamping pulses to the grids of both valves simultaneously and mechanical switch means connected to said valves and operative between two positions such that in one of said positions the valves in the clamp circuit are controlled by the clamp pulses to clamp the video signal to the clamping potential, and in the other of said positions means are provided to render the clamp pulses ineffective on the valves and to cut off one of the valves whilst the other valve is caused to operate as a D.C. restorer to restore the video signal to a predetermined D.C. potential.

4. A circuit arrangement as claimed in claim 3, in which the two valves comprise triode valves.

5. A circuit arrangement as claimed in claim 3, in which means are provided to maintain the D.C. restoration potential at the same value as the clamping potential.

6. A circuit arrangement for alternatively clamping or D.C. restoring a video signal, comprising a conductor carrying the video signal, a clamp circuit consisting of two valves each having an anode, a cathode, and at least one grid electrode and, means connecting the anode of one valve to the cathode of the other valve and to the conductor carrying the video signal, means connecting the cathode of the one valve to the anode of the other valve and to a point of clamping potential, a source of clamping pulses, means for applying said clamping pulses to the grids of both valves simultaneously and mechanical switch means connected to said valve but isolated from the video signal path and operative between two positions such that in one of said positions the valves in the clamp circuit are controlled by the clamp pulses to clamp the video signal to the clamping potential, and in the other of said positions means are provided to render the clamp pulses ineffective on the valves and to cut off one of the valves whilst the other valve is caused to operate as a D.C. restorer to restore the video signal to a predetermined D.C. potential.

7. A circuit arrangement for alternatively clamping or D.C. restoring a video signal, comprising a video signal path, a pulse-operated clamp circuit consisting of a phase splitting device and two diode devices, said two diode devices respectively having an anode and a cathode, the anode of one diode and the cathode of the other diode being connected to the video signal path and the cathode of one diode and the anode of the other diode being connected respectively to the two outputs of said phase splitting device, a source of clamping pulses, means for applying the clamping pulses to the input of the phase splitting device and mechanical switch means connected to one of said diodes and operable between two positions so that in one position said two diode devices operate by means of said clamping pulses to clamp the video signal to a predetermined potential, and in the other position one of the diode devices is rendered inoperative and the remaining diode device operates as a D.C. restorer to restore the video signal to a predetermined D.C. potential.

8. A circuit arrangement as claimed in claim 7, including means for removing the clamping pulses from the D.C. restoring diode which operates to D.C. restore the tips of the synchronising pulses included in the video signal to said predetermined D.C. potential.

9. A circuit arrangement as claimed in claim 7, in which the phase splitting device includes a further D.C. restorer in its input for restoring the applied clamping pulses to a reference potential.

10. A circuit arrangement as claimed in claim 9, in which the reference potential is the predetermined potential to which the video signal is clamped.

References Cited in the file of this patent

UNITED STATES PATENTS

| | | |
|---|---|---|
| 2,445,040 | Schade | July 13, 1948 |
| 2,539,774 | Gluyas | Jan. 30, 1951 |
| 2,843,665 | Clayden | July 15, 1958 |

FOREIGN PATENTS

| | | |
|---|---|---|
| 733,066 | Great Britain | July 6, 1955 |